(12) United States Patent
Kilian

(10) Patent No.: US 9,879,408 B2
(45) Date of Patent: Jan. 30, 2018

(54) DEVICE FOR CHANGING THE JET SHAPE OF FREE-FLOWING PRODUCTS

(71) Applicant: SIG Technology AG, Neuhausen am Rheinfall (CH)

(72) Inventor: Felix Kilian, Hannover (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 0 days.

(21) Appl. No.: 15/026,075

(22) PCT Filed: Aug. 26, 2014

(86) PCT No.: PCT/EP2014/068044
§ 371 (c)(1),
(2) Date: Mar. 30, 2016

(87) PCT Pub. No.: WO2015/043853
PCT Pub. Date: Apr. 2, 2015

(65) Prior Publication Data
US 2016/0214750 A1    Jul. 28, 2016

(30) Foreign Application Priority Data
Sep. 30, 2013   (DE) .......................... 10 2013 110 787

(51) Int. Cl.
*E03C 1/08*   (2006.01)
*B67C 3/26*   (2006.01)
(Continued)

(52) U.S. Cl.
CPC .................. *E03C 1/08* (2013.01); *B05B 1/14* (2013.01); *B05B 1/1609* (2013.01); *B05B 1/34* (2013.01);
(Continued)

(58) Field of Classification Search
CPC ...................................... F15D 1/02; E03C 1/08
(Continued)

(56) References Cited

U.S. PATENT DOCUMENTS 4,512,379 A * 4/1985 Hennig .................... B65B 3/22
141/286
4,559,275 A * 12/1985 Matt ....................... F01D 9/023
137/625.28
(Continued)

FOREIGN PATENT DOCUMENTS

DE   102004029679 A1   12/2005
EP      0919472 A1    6/1999
(Continued)

*Primary Examiner* — Timothy L Maust
*Assistant Examiner* — Timothy P Kelly
(74) *Attorney, Agent, or Firm* — The Webb Law Firm

(57) ABSTRACT

A device for changing the jet shape of free-flowing products, in particular of foodstuffs, including: an inflow area for the free-flowing products to enter, an outflow area for the free-flowing products to exit, and several channels through which to pass the free-flowing products. Each channel has an inlet allocated to the inflow area and an outlet allocated to the outflow area. Each inlet of a channel has a first cross sectional area. Each outlet of a channel has a second cross sectional area. In order to make it easy to adjust the shape and velocity profile of the filling jet, it is proposed that the second cross sectional area of at least one channel be larger than the first cross sectional area of this channel.

14 Claims, 5 Drawing Sheets

(51) Int. Cl.
  *B67C 3/28* (2006.01)
  *B05B 1/14* (2006.01)
  *B05B 1/16* (2006.01)
  *B65B 3/04* (2006.01)
  *B05B 1/34* (2006.01)
  *B65B 39/00* (2006.01)
  *B65B 55/02* (2006.01)
  *B65B 3/22* (2006.01)

(52) U.S. Cl.
  CPC .............. *B65B 3/04* (2013.01); *B65B 39/007* (2013.01); *B67C 3/2608* (2013.01); *B67C 3/281* (2013.01); *B65B 3/22* (2013.01); *B65B 55/02* (2013.01); *B65B 2039/009* (2013.01)

(58) Field of Classification Search
  USPC ...... 141/286; 138/37; 239/590.3, 590.5, 504
  See application file for complete search history.

(56) References Cited

U.S. PATENT DOCUMENTS 4,574,853 A * 3/1986 Graffin .................... B65B 39/00
                                                                    138/44
6,076,750 A * 6/2000 Mykkanen .............. B65B 39/00
                                                                    141/311 A

FOREIGN PATENT DOCUMENTS

| EP | 1908855 A1 | 4/2008 |
| EP | 2078678 A1 | 7/2009 |
| FR | 2511971 A1 | 3/1983 |
| FR | 2905121 A1 | 2/2008 |
| WO | 9715493 A1 | 5/1997 |

* cited by examiner

DEVICE FOR CHANGING THE JET SHAPE OF FREE-FLOWING PRODUCTS

CROSS-REFERENCE TO RELATED APPLICATIONS

This application is the U.S. national phase of International Application No. PCT/EP2014/068044 filed Aug. 26, 2014, and claims priority to German Patent Application No. 10 2013 110 787.7 filed Sep. 30, 2013, the disclosures of which are hereby incorporated in their entirety by reference.

BACKGROUND OF THE INVENTION

Field of the Invention

The invention relates to a device for changing the jet shape of free-flowing products, in particular of foodstuffs, comprising: An inflow area for the free-flowing products to enter, an outflow area for the free-flowing products to exit, and several channels through which to pass the free-flowing products, wherein each channel comprises an inlet allocated to the inflow area and an outlet allocated to the outflow area, wherein each inlet of a channel has a first cross sectional area, and wherein each outlet of a channel has a second cross sectional area.

The invention also relates to the use of such a device for filling foodstuffs, in particular for aseptically filling foodstuffs.

Description of Related Art

Known in the area of packaging technology are numerous ways of filling free-flowing products into the packagings provided for this purpose. For example, the free-flowing products can be foodstuffs like milk, fruit juice, sauces or yogurt. Composite packagings with layers made of cardboard and plastic can be used as the packagings, for example.

One important step in filling the packagings has to do with filling the free-flowing products into the packagings as quickly as possible, so that a fast rhythm, and hence high numbers, can be achieved. However, filling is to take place largely without splashing and frothing despite the high flow rate, so that the hygiene requirements can be met, and to prevent the packaging or filling machine from becoming contaminated.

Especially stringent hygiene requirements are encountered for foodstuffs that are filled under sterile, i.e., germ-free, conditions.

The stringent requirements can only be satisfied by adjusting the filling process to individual factors, for example the properties of the product to be filled and the volume and shape of the packaging. The adjustment routinely involves setting the flow volume and flow rate. In addition, the filling nozzle is often tailored to the product to be filled and the packaging, and changed out as needed. The filling nozzle largely determines the shape and speed profile of the filling jet. In addition, the filling nozzle is responsible for a drip-free filling. To this end, the volume flow is divided into several partial flows before exiting the filling nozzle, which are guided through individual channels. The advantage to this is that the product to be filled comes into contact with a larger wall surface, so that the residual quantity of product to be filled is reliably held in the channels if filling is interrupted, and does not drip uncontrollably onto the packaging or filling machine ("capillary effect").

A filling nozzle for filling foodstuffs is known from EP 2 078 678 A1, for example. The filling nozzle shown therein comprises a replaceable plate with numerous holes for dividing up the volume flow. The holes are cylindrically shaped, and run parallel to each other so as to generate an especially straight filling jet with the plate ("flow straightening plate"). While the inlets of the holes lie in a plane, the outlets of the holes are situated on a curved surface, so that the holes vary in length viewed in the direction of flow. Varying the length of the holes is intended to influence the flow rate. In particular, the flow rate in the middle of the filling jet is to be decelerated more strongly by longer holes and the resultant higher friction than in the edge areas of the filling jet.

The filling nozzle known from EP 2 078 678 A1 has several disadvantages. First, the two-part construction makes it necessary to seal the plate away from the body of the filling nozzle. Residual product can become deposited in the gap between the plate and body to be sealed, which poses hygiene problems. Another disadvantage lies in the varying length of the holes. This is because a curved outflow area of the plate causes the partial flows of the product to be filled to detach from the underside of the plate at different times, and additionally exposes them to a varying drop height to the floor of the packaging. Those partial flows that are guided through shorter holes and detach from the underside of the plate sooner experience a gravitational acceleration earlier than those partial flows that are still in the longer holes at this point in time.

The varying drop heights cause the partial flows to accelerate for different times during freefall, and to accelerate at different increments. As a consequence, the velocity profile that arises on the underside of the plate is again altered during freefall. As a result, the velocity profile of crucial importance with respect to splashing as the filling jet impacts the bottom of the packaging can only be set very imprecisely with the proposed solution.

Therefore, an object of the invention is to configure and further develop the device described above in greater detail in such a way that the shape and velocity profile of the filling jet can be easily set.

SUMMARY OF THE INVENTION

The device according to the invention is initially distinguished by an inflow area for the free-flowing products to enter, as well as by an outflow area for the free-flowing products to exit. Situated between the inflow area and outflow area are several channels for guiding through the free-flowing products. Each of the channels comprises an inlet that is allocated to the inflow area. In addition, each of the channels comprises an outlet that is allocated to the outflow area. Each inlet has a first cross sectional area, and each outlet has a second cross sectional area.

According to the invention, the second cross sectional area of at least one channel is larger than the first cross sectional area of this channel. The second cross sectional area of each channel is preferably larger than the first cross sectional area of this channel. In other words, the cross sectional area of the channels increases in the direction of flow, i.e., from the inlet toward the outlet. Under the laws of fluid mechanics, in particular Bernoulli's principle, an increase in the cross sectional area leads to a proportional decrease in the flow speed. Accordingly, configuring the channels according to the invention leads to a deceleration of the partial flow streaming in the channel. The quotient of the first cross sectional area and second cross sectional area is thus always less than one, and represents a gauge for the degree of deceleration. As a consequence, this quotient can also be referred to as the "deceleration factor"; by contrast, its reciprocal can be referred to as the "acceleration factor". For example, the device according to the invention can be made out of metal, in particular out of steel, preferably stainless steel. The channels can be drilled in a deep drilling process or cut via wire erosion, for example.

In an embodiment of the invention, the cross sectional area can be enlarged uniformly, and in particular continuously and/or monotonously. The continuous and/or monotonous enlargement of the cross sectional area can take place for at least one channel or (preferably) all channels. Continuous enlargement is understood as enlargement without sudden changes in cross sectional area. Monotonous enlargement of the cross sectional area means that the cross sectional area does not decrease again in the direction of flow at any time, but rather either remains identical or increases continually. For example, this can be achieved with cone-shaped channel walls.

In an embodiment of the invention, the quotient comprised of the sum of first cross sectional areas for all channels and the sum of second cross sectional areas for all channels ranges from 0.35 to 0.75. This means that the entire cross sectional area at the inlet of the channels measures only about 35% to 75% of the entire cross sectional area at the outlet of the channels. As a result, the entire cross sectional area tangibly increases in the direction of flow, so that the overall flow slows down.

In an embodiment of the invention, the quotient comprised of the first cross sectional area and second cross sectional area for each channel ranges from 0.35 to 0.75. This means that not just the sum of cross sectional areas, but the cross sectional area at the inlet of each individual channel measures only about 35% to 75% of the cross sectional area at the outlet of this channel. As a consequence, each individual channel is to help tangibly enlarge the cross sectional area, and thus slow down the flow to an extent lying within the mentioned range. It can be provided that the quotient comprised of the first cross sectional area and second cross sectional area—i.e., the deceleration factor—be identical for each channel; alternatively, the quotients can also vary within the mentioned range between the channels, so that flow deceleration can be individually adjusted for each channel.

In another instruction of the invention, the eccentric channels are spaced apart from the middle axis of the device, and the quotient comprised of the first cross sectional area and second cross sectional area drops, in particular continuously or monotonously drops, as the distance between the eccentric channels and middle axis of the device rises. An eccentric channel is understood as any channel that does not run along the middle axis of the device. Therefore, this instruction provides that the quotient comprised of the first cross sectional area and second cross sectional area—i.e., the deceleration factor—be smaller for the outlying channels than for the more inwardly lying channels. The flow in the outlying channels is thus to be slowed to a greater extent than the more inwardly lying channels. The deceleration factor here preferably becomes increasingly smaller the farther out the channel is situated.

In another embodiment of the invention, the inlets and/or outlets of the eccentric channels are arranged on circular rings around the middle axis of the device. In this embodiment, several channels can be arranged in such a way that their inlets and/or their outlets are equidistant from the middle axis. This makes it possible to generate a uniform, symmetrically shaped filling jet.

With respect to this embodiment, it is further suggested that the quotients comprised of the first cross sectional area and second cross sectional area are identical for all eccentric channels of the same ring. This means that those partial flows that are equidistant from the middle axis are also decelerated to the same extent. This makes it possible to generate a filling jet with a symmetrical velocity profile.

In this regard, it is further suggested that the quotients comprised of the first cross sectional area and second cross sectional area drop, in particular continuously or monotonously drop, as the distance between the ring and middle axis of the device rises. As a result, the partial flows in the channels of the inner rings are slowed to less of an extent than the partial flows in the channels of the more outwardly lying rings. This makes it possible to generate a filling jet with an incremental velocity profile, wherein the channels of each ring represent an increment.

In another embodiment of the invention, the inlets and/or outlets of the channels are arranged in one plane. The advantage to arranging the inlets in a plane is that all inlets can be reliably sealed at the same time by an especially simply designed, in particular flat, sealing element. The advantage to arranging the outlets in one plane is that all partial flows detach from the underside of the device simultaneously, and hence are exposed to gravitational acceleration simultaneously. The plane in which the channel inlets are arranged is preferably parallel to the plane in which the channel outlets are arranged. At least for channels that follow a straight line progression, the advantage to this is that the channels are equally long, and hence the friction-induced deceleration of partial flows is roughly the same in all channels.

In an embodiment of the invention, it is proposed that the inlets and/or outlets of the channels be arranged in a point-symmetrical or axially symmetrical manner. Symmetrically distributing the inlets and/or outlets yields a uniform, low-turbulence distribution of the flow and a symmetrical filling jet.

A further development of the invention provides that the number of channels measures at least 50, and in particular ranges between 100 and 150. In this further development, the overall flow is to be divided into a particularly high number of partial flows. The advantage to this is that the speed and direction of this partial flow can be individually set for each partial flow, so that even complex shapes and velocity profiles can be achieved for the filling jet. In addition, a high number of channels leads to a larger contact surface between the flow and channel, which lowers the risk of dripping if the filling process is interrupted due to a capillary effect.

In an embodiment of the invention, it is provided that the channels be separated from each other in the area of their outlets by webs with a thickness of 0.3 mm or less. The web thickness preferably even measures 0.2 mm or less. After exiting the device, the partial flows should again merge into a single overall flow having the smallest possible air pockets. This process is supported by particularly thin webs at the channel outlets, since the closely spaced partial flows can rapidly combine into an overall flow as a result of attractive forces.

In another embodiment of the invention, the middle axes of the eccentric channels are inclined by an angle of inclination relative to the middle axis of the device. Tilting the eccentric channels allows a horizontal momentum to also be imparted to the partial flows in these channels in addition to a vertical momentum. This permits an especially variable shaping of the filling jet. The respective channels can be outwardly or inwardly inclined as viewed in the direction of flow. An outward inclination spreads or splits the filling jet, and guides it laterally along the walls of the packaging. In this way, the packaging is filled in an especially gentle manner and largely without frothing. By contrast, an inward inclination allows for a particularly acute, concentrated filling jet.

With regard to this embodiment, it is further proposed that the angle of inclination range between 1° and 6°. The angle of inclination is the angle that comes about between the middle axis of the device and the middle axis of the corresponding channel. The indicated range can once again relate to an outward inclination or an inward inclination.

It is further proposed with regard to these two embodiments that the angle of inclination for the eccentric channels rise, in particular continuously or monotonously rise, as the distance between the channels and middle axis of the device increases. As a result, the more outwardly the channel is arranged, the greater the inclination of the channels is to be. The stronger inclination of the outer channels is advantageous in particular given an inward inclination, since an especially thin, concentrated filling jet can be achieved in this way.

The device described above can be used especially well in all described embodiments to fill foodstuffs, in particular to aseptically fill foodstuffs. For example, the foodstuffs can be milk, fruit juice, sauces or yoghurt.

BRIEF DESCRIPTION OF THE DRAWINGS

The invention will be described in greater detail below based upon a drawing that only represents a preferred exemplary embodiment. The drawing shows:

FIG. 1b a cross section depicting a magnified cutout of the filling nozzle plate from FIG. 1a, FIG. 1c the filling nozzle plate from FIG. 1a along the intersecting plane Ic-Ic recorded on FIG. 1a, FIG. 2a a cross section depicting a first embodiment of a device according to the invention for changing the jet shape of free-flowing products, FIG. 2b a cross section depicting the device from FIG. 2a along the intersecting plane IIb-IIb recorded on FIG. 2a, FIG. 2c a cross section depicting the device from FIG. 2a along the intersecting plane IIc-IIc recorded on FIG. 2a, FIG. 3a a cross section depicting a second embodiment of a device according to the invention for changing the jet shape of free-flowing products, FIG. 3b a cross section depicting the device from FIG. 3a along the intersecting plane IIIb-IIIb recorded on FIG. 3a, and FIG. 3c a cross section depicting the device from FIG. 3a along the intersecting plane IIIc-IIIc recorded on FIG. 3a.

DETAILED DESCRIPTION OF THE INVENTION

Figure 1A:
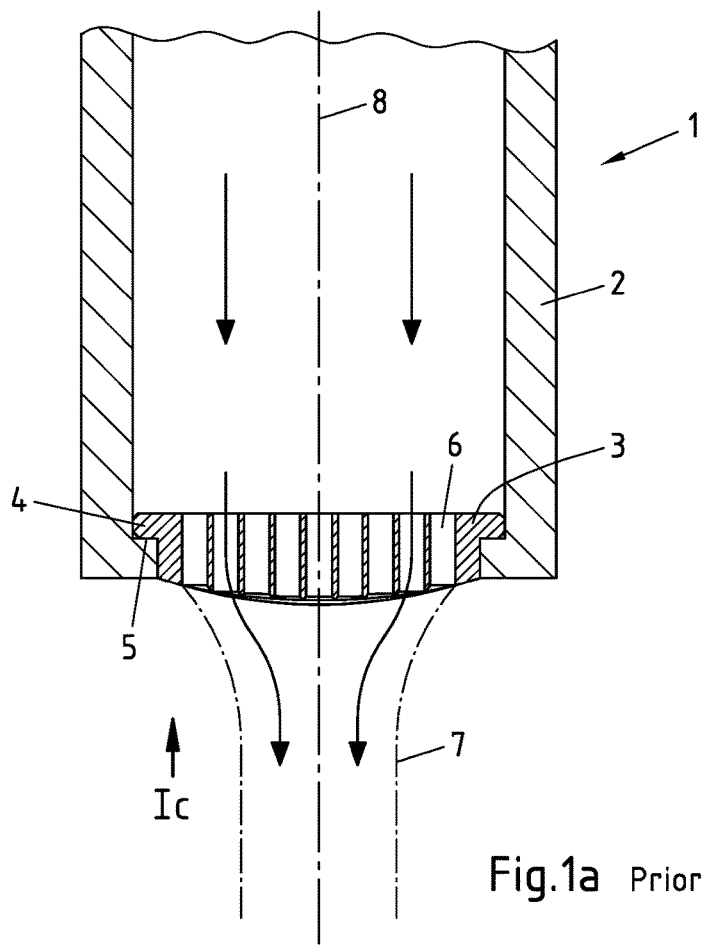
FIG. 1a a cross section of a filling nozzle known from prior art.

FIG. 1 presents a cross section depicting a filling nozzle 1 known from prior art. The filling nozzle 1 encompasses a body 2 and a plate 3 to shape the flow. The plate 3 can be replaceably inserted in the body 2 by placing a continuous flange 4 provided on the plate 3 on a projection 5 provided on the body 2. The plate 3 comprises several holes 6 that allow free-flowing products to stream through the filling nozzle 1, as schematically denoted by arrows on FIG. 1a. After exiting the filling nozzle 1, the free-flowing products form a jet 7, whose outer contour is depicted on FIG. 1. A middle axis 8 runs centrally through the body 2 and plate 3.

Figures 1B, 1C:
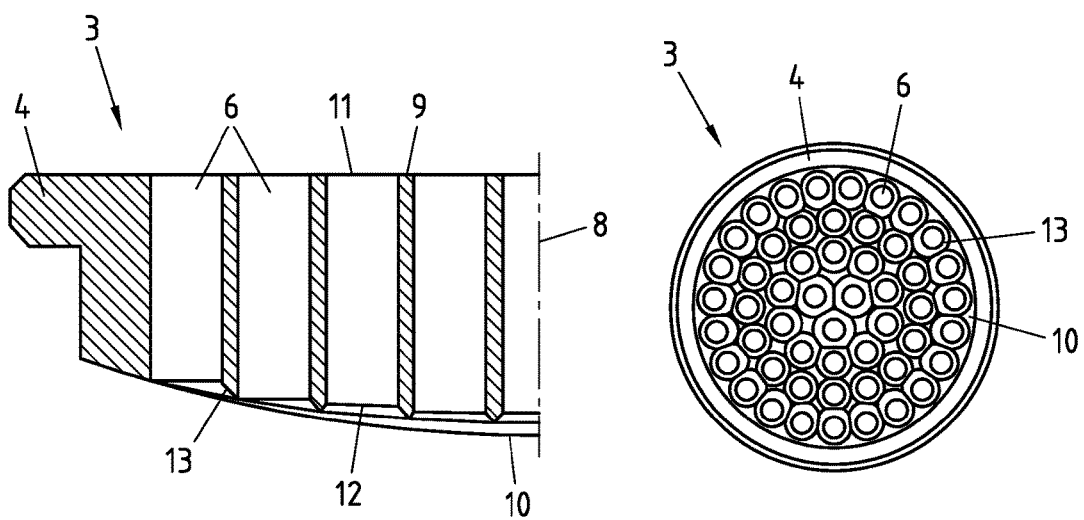

FIG. 1b presents a cross section depicting a magnified cutout of the plate 3 of the filling nozzle 1 from FIG. 1a. The areas of the plate 3 already described in conjunction with FIG. 1a are provided with corresponding reference numbers on FIG. 1b. The plate 3 comprises an upper side 9 for the free-flowing products to enter, and an underside 10 for the free-flowing products to exit. The holes 6 join the upper side 9 with the underside 10. Each hole 6 comprises an inlet 11 and an outlet 12, wherein the inlets 11 are allocated to holes 6 on the upper side 9, and wherein the outlets 12 are allocated to holes 6 on the underside 10. In the plate 3 depicted on FIG. 1b, all holes 6 run parallel to the middle axis 8 of the plate 3, and thus comprise no inclination. In addition, the cross sectional area of all holes 6 is identical, and does not change in the direction of flow, i.e., from the inlet 11 to the outlet 12. The upper side 9 is formed by a plane, in which lie the inlets 11 of the holes 6. By contrast, the underside 10 is formed by a curved surface, in which lie the outlets 12 of the holes. The underside 10 is curved in such a way that those holes 6 in proximity to the middle axis 8 are longer than those holes 6 lying in the edge area of the plate 3. Continuous chamfers 13 can be provided on the edges of the outlets 12.

FIG. 1c depicts the plate 3 of the filling nozzle 1 from FIG. 1a along the intersecting plane Ic-Ic recorded on FIG. 1a, i.e., viewed from the underside. The areas of the plate 3 already described in conjunction with FIG. 1a and FIG. 1b are also provided with corresponding reference numbers on FIG. 1c. To improve clarity, it was decided not to depict the body 2 on FIG. 1c. As illustrated on FIG. 1c, a plurality of holes 6 are arranged closely together, and take up nearly the entire surface of the plate 3 in the process. The filling nozzle 1 depicted on FIG. 1a, FIG. 1b and FIG. 1c largely corresponds to the filling nozzle known from EP 2 078 678 A1.

Figure 2A:
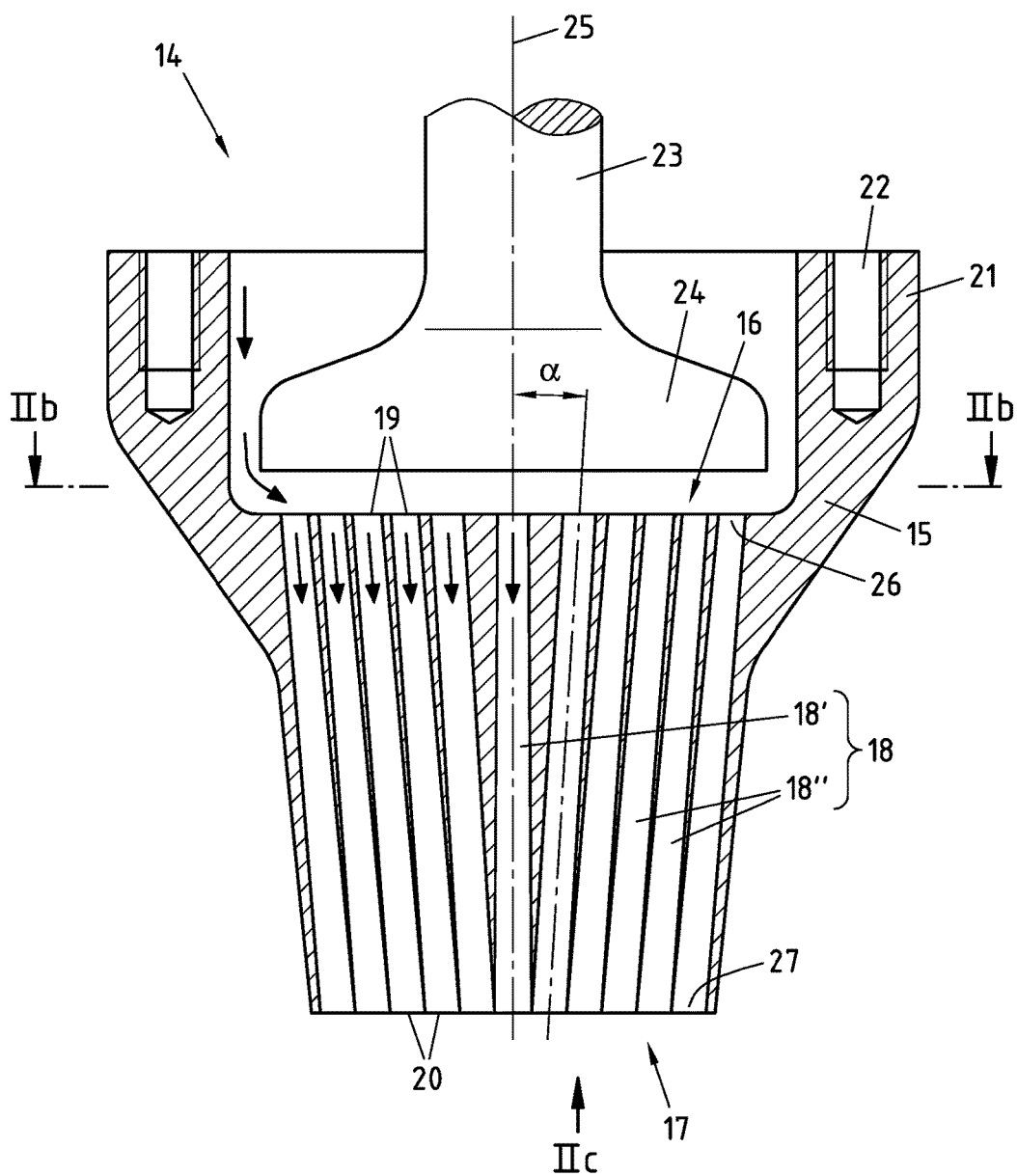

FIG. 2a presents a cross section depicting a first embodiment of a device 14 according to the invention for changing the jet shape of free-flowing products. The device 14 comprises a one-piece housing 15, which has an inflow area 16 for the free-flowing products to enter, and an outflow area 17 for the free-flowing products to exit. Situated between the inflow area 16 and outflow area 17 are a plurality of channels 18 for guiding through the free-flowing products in the housing 15. Each of the channels 18 comprises an inlet 19 that is allocated to the inflow area 16, and an outlet 20 that is allocated to the outflow area 17. In the device 14 shown on FIG. 2a, both the inflow area 16—and hence also the inlets 19—as well as the outflow area 17—and hence also the outlets 20—are arranged in one plane, wherein the two planes lie parallel to each other. Finally, the upper side of the device 14 comprises a continuous flange 21 that incorporates several boreholes 22. For example, the device 14 can be connected with a filling machine via the boreholes 22.

FIG. 2a further presents a valve rod 23 with a sealing element 24. While these components are not part of the device 14, they do serve to explain how it functions. In order to interrupt the flow streaming through the device 14 (schematically denoted with arrows on FIG. 2a), the valve rod 23 is lowered, so that the sealing element 24 is pressed onto the inflow area 16 and seals the inlets 19 of the channels 18 located there. A middle axis 25 runs centrally through the valve rod 23, the sealing element 24 and the device 14.

In the device 14 exemplarily depicted on FIG. 2a, the channels 18 can be divided into one central channel 18' and into several eccentric channels 18". The middle axis of the central channel 18' corresponds to the middle axis 25 of the device; therefore, the central channel 18' runs straight down, and stands perpendicularly on the two planes of the inflow area 16 and outflow area 17. By contrast, the middle axes of the eccentric channels 18" are inclined relative to the middle axis 25 of the device 14 by an angle of inclination α. The angle of inclination for the eccentric channels 18" rises continuously or monotonously as does the distance between the channels 18" and middle axis 25 of the device 14. In other words, those eccentric channels 18" with the greatest distance from the middle axis 18"—i.e., the radially outlying channels 18"—are inclined the most. Viewed in the direction of flow, the eccentric channels 18" are inclined toward the middle axis 25, so that the outlets 20 of the channels 18" lie closer to the middle axis 25 than the inlets 19 of the channels 18".

The channels 18 of the device 14 exemplarily depicted on FIG. 2a comprise a first cross sectional area 26 and a second cross sectional area 27, wherein the first cross sectional area 26 is measured at the inlets 19, and wherein the second cross sectional area 27 is measured at the outlets 20. The channels 18 in the device 14 shown on FIG. 2a are distinguished by the fact that the second cross sectional area 27 of each channel 18 is larger than the first cross sectional area 26 of this channel 18. This relates both to the central channel 18' and eccentric channels 18". In other words, the cross sectional area of the channels 18 increases from their inlets 19 to their outlets 20 as viewed in the direction of flow.

Figure 2B:
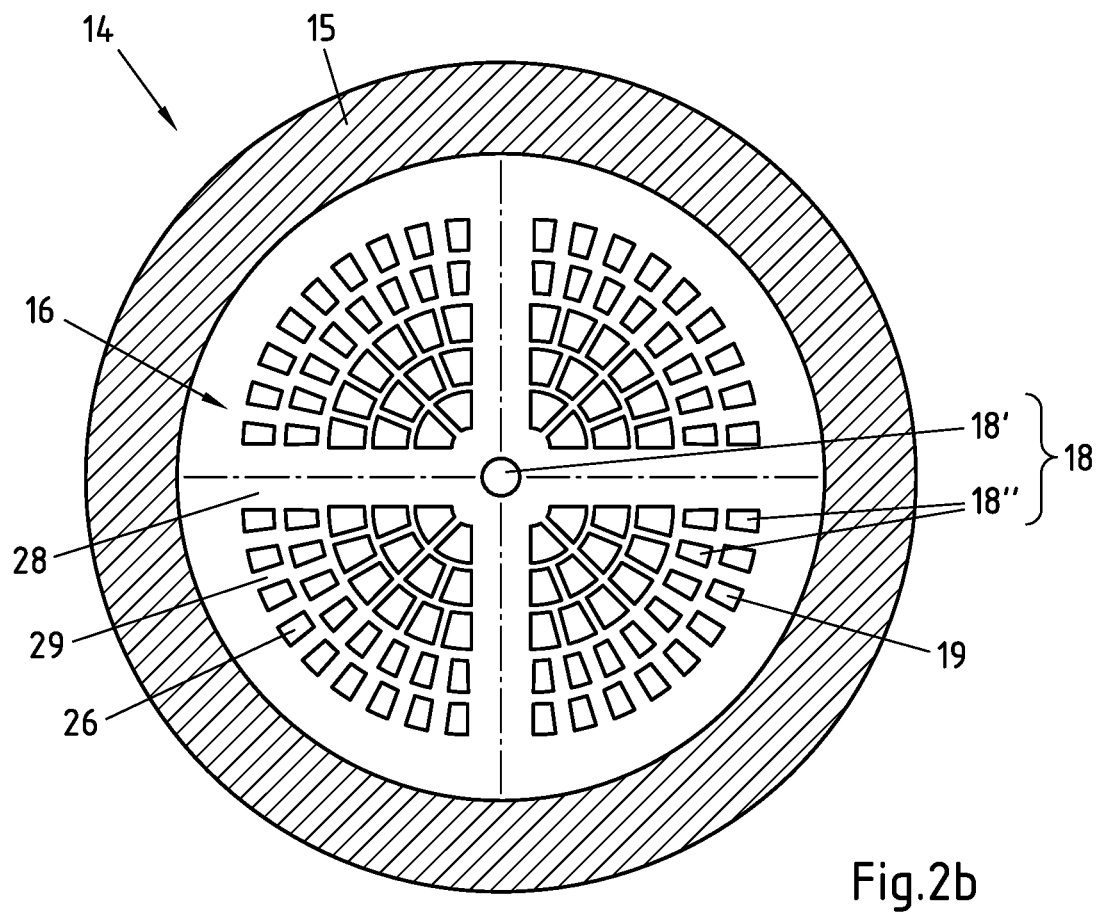

FIG. 2b presents a cross section depicting the device 14 from FIG. 2a along the intersecting plane IIb-IIb recorded on FIG. 2a. Accordingly, FIG. 2b provides a view of the inflow area 16 of the device 14. The areas of the device 14 already described in conjunction with FIG. 2a are marked with the corresponding reference numbers on FIG. 2b. As evident from FIG. 2b, the device 14 has a circular cross section. In the device 14 exemplarily depicted on FIG. 2b, the circular area of the inflow area 16 can be divided into sealing areas 28 and four entry areas 29, of which each covers roughly an area of 90°. The sealing areas 28 are intended for the sealing abutment by the sealing element 24 not shown on FIG. 2b. Situated in each of the four entry areas 29 are twenty nine eccentric channels 18", whose inlets 19 are visible. The central channel 18' lies in the middle of the inflow area 16. The inlets 19 of the channels 18 in the device 14 depicted on FIG. 2b have a specific pattern: The eccentric channels 18" are circularly arranged on five concentric rings around the central channel 18'. The first, innermost ring has eight channels 18" (two per entry area 29). The second ring has sixteen channels 18" (four per entry area 29). The third ring has twenty four channels 18" (six per entry area 29). The fourth ring has thirty two channels 18" (eight per entry area 29), and the fifth ring finally has thirty six channels 18" (nine per entry area 29). A total of one hundred seventeen channels 18 are thus present.

Figure 2C:
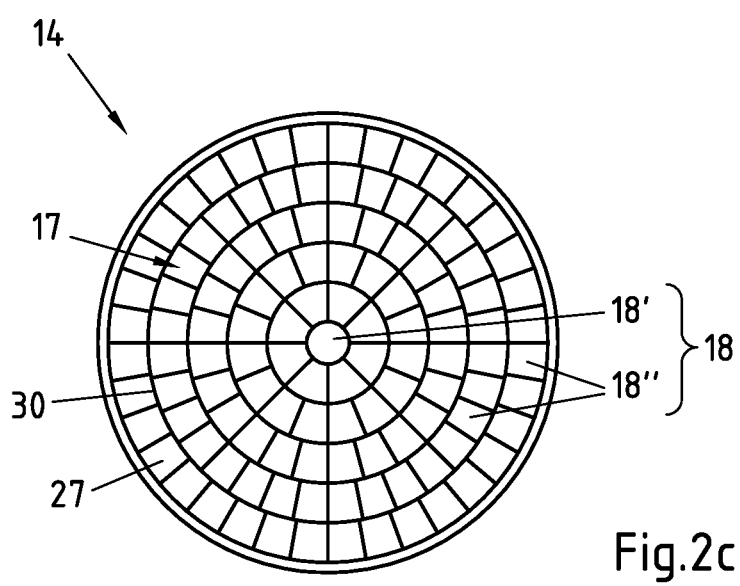

FIG. 2c presents a cross section depicting the device 14 from FIG. 2a along the intersecting plane IIc-IIc recorded on FIG. 2a. Accordingly, FIG. 2c provides a view of the outflow area 17 of the device 14. The areas of the device 14 already described in conjunction with FIG. 2a or FIG. 2b are marked with the corresponding reference numbers on FIG. 2c. As opposed to the surface of the inflow area 16, the surface of the outflow area 17 is no longer divided into sealing areas 28 and entry areas 29, first of all since no surface for abutment by the sealing element 24 is there necessary, and second of all since more surface is needed for the channel cross sections that are enlarged in this region. For this reason, the channels 18 in the plane of the outflow area 17 are only still separated from each other by very narrow webs 30. The channels 18 are also divided into four segments in the outflow area 17, which each cover about 90° of the surface, and are distributed around the central channel 18' in a point-symmetrical manner.

Figure 3A:
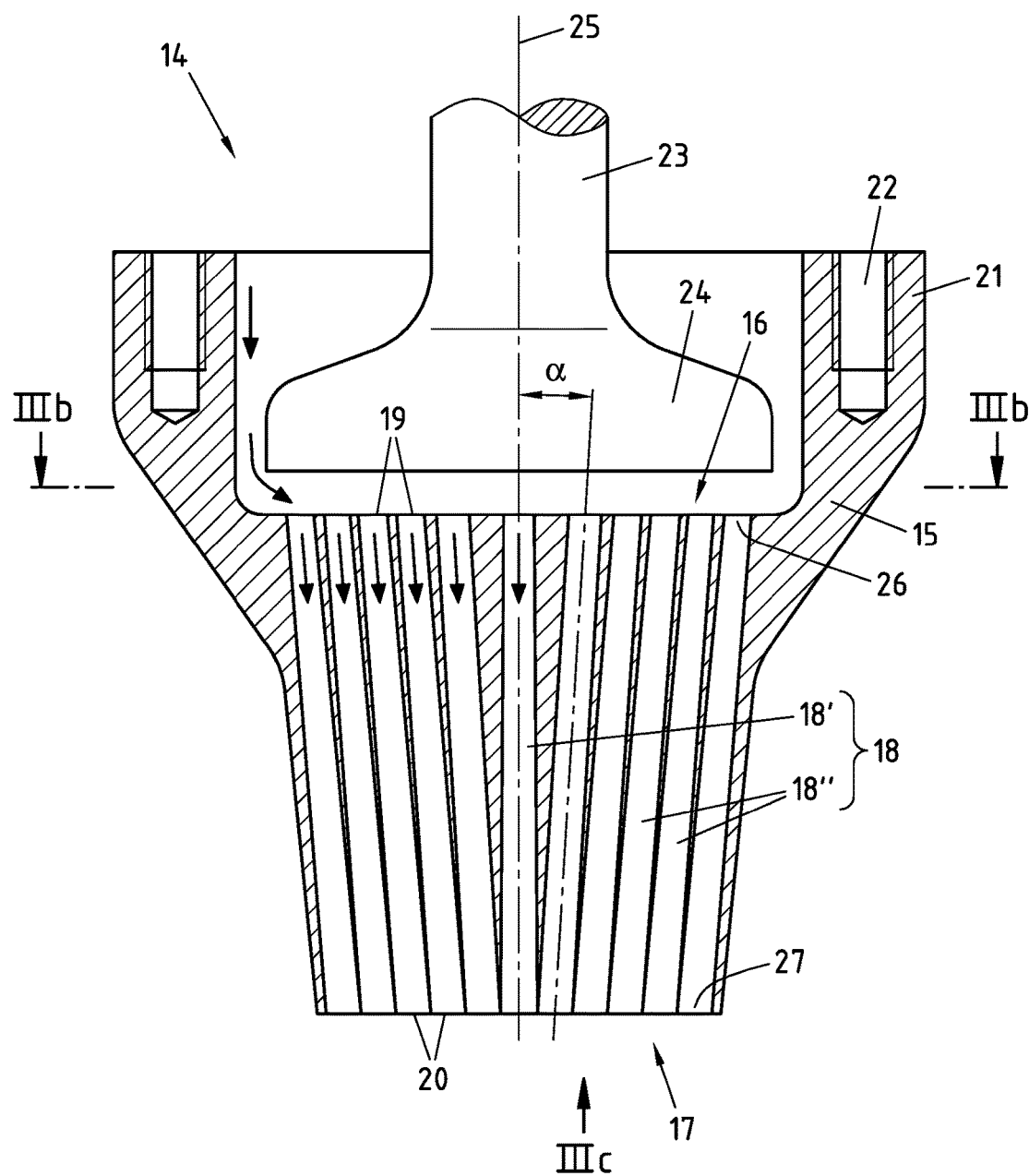

FIG. 3a presents a cross section of a second embodiment of a device 14 according to the invention for changing the jet shape of free-flowing products. The areas already described in conjunction with the first embodiment (FIG. 2a-FIG. 2c) of the device 14 are marked with the corresponding reference numbers on FIG. 3a. The essential difference between the first and second embodiments of the device 14 lies in a variable arrangement of the channels 18 and their inlets and outlets 19, 20. The differences will be illustrated below based upon FIG. 3b and FIG. 3c.

Figure 3B:
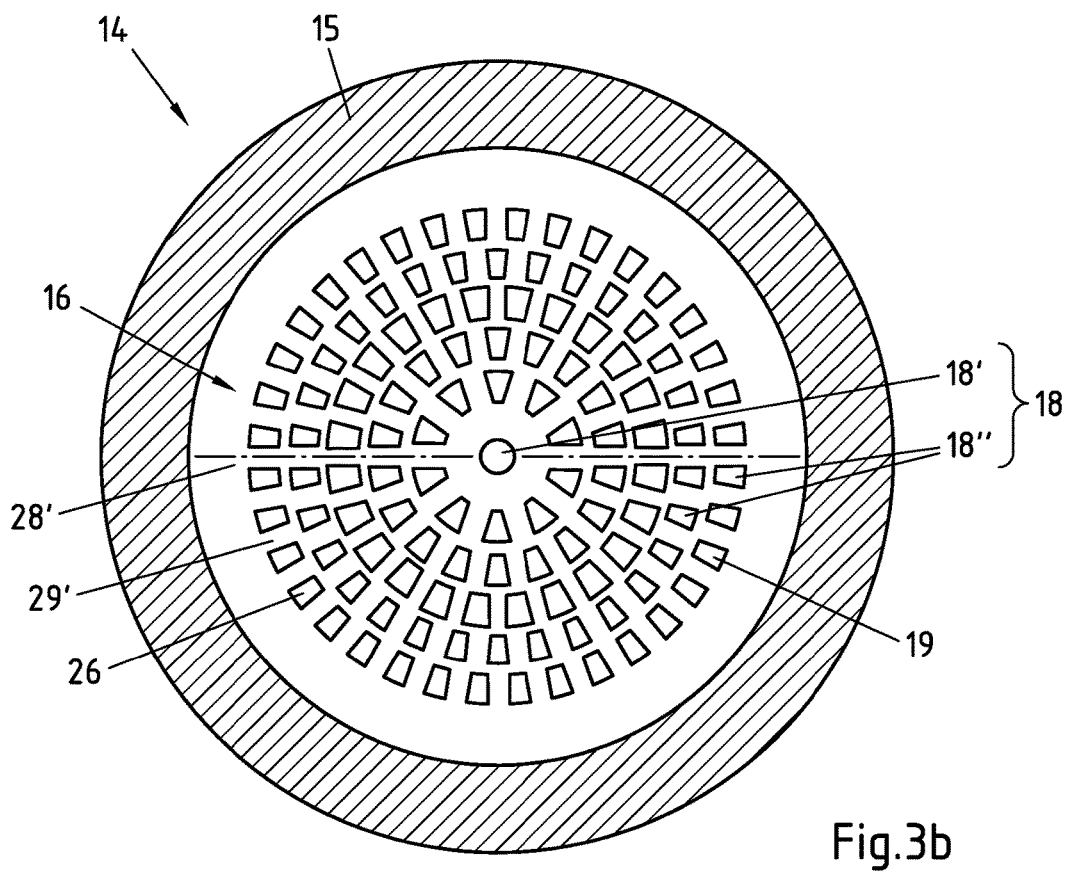

FIG. 3b presents a cross section depicting the device 14 from FIG. 3a along the intersecting plane IIIb-IIIb recorded on FIG. 3a. Accordingly, FIG. 3b provides a view of the inflow area 16 of the device 14. The essential difference between the first and second embodiment of the device 14 lies in the fact that, in the device 14 depicted on FIG. 3b, the surface of the inflow area 16 is divided into a sealing area 28' and two entry areas 29', of which each covers roughly an area of 180°. The sealing area 28' separates the two entry areas 29'. The inlets 19 of the channels 18 in the device 14 shown on FIG. 3b also have a specific pattern: The eccentric channels 18" are circularly arranged on five concentric rings around the central channel 18'. The first, innermost ring has ten channels 18" (five per entry area 29'). The second ring has eighteen channels 18" (nine per entry area 29'). The third ring has twenty four channels 18" (twelve per entry area 29). The fourth ring has thirty channels 18" (fifteen per entry area 29'), and the fifth ring finally has thirty six channels 18" (eighteen per entry area 29). A total of one hundred nineteen channels 18 are thus present.

Figure 3C:
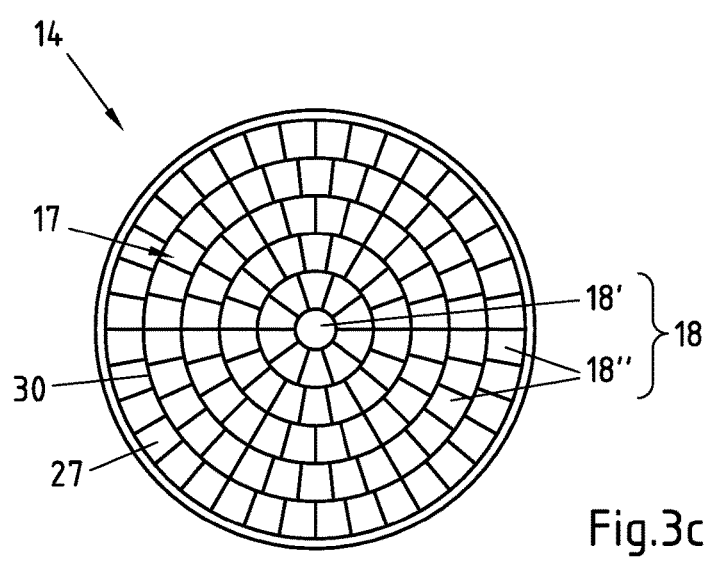

FIG. 3c presents a cross section depicting the device from FIG. 3a along the intersecting line IIIc-IIIc recorded on FIG. 3a. Accordingly, FIG. 3c provides a view of the outflow area 17 of the device 14. The essential difference between the first and second embodiment of the device 14 lies in the fact that, in the device 14 depicted on FIG. 3c, the channels 18 are divided into two segments, which each cover about 180° of the surface, and are arranged in a mirror symmetrical manner to each other.

LIST OF REFERENCE NUMERALS

1: Filling nozzle
2: Body
3: Plate
4: Flange
5: Projection
6: Hole
7: Jet
8: Middle axis
9: Upper side
10: Underside
11: Inlet
12: Outlet
13: Chamfer
14: Device
15: Housing
16: Inflow area
17: Outflow area
18, 18', 18": Channel
19: Inlet
20: Outlet
21: Flange
22: Borehole 23: Valve rod
24: Sealing element
25: Middle axis
26: First cross sectional area
27: Second cross sectional area
28, 28': Sealing area
29, 29': Entry area
30: Web

The invention claimed is:

1. A device for changing the jet shape of free-flowing products, comprising:
an inflow area for the free-flowing products to enter,
an outflow area for the free-flowing products to exit, and
several channels through which to pass the free-flowing products, the several channels comprising at least a plurality of eccentric channels spaced apart from a middle axis of the device,
wherein each eccentric channel comprises an inlet allocated to the inflow area and an outlet allocated to the outflow area,
wherein each inlet of the eccentric channels has a first cross sectional area,
wherein each outlet of the eccentric channels has a second cross sectional area,
wherein a quotient comprised of the first cross sectional area and the second cross sectional area drops as a distance between the eccentric channels and the middle axis of the device rises,
wherein the inlets and outlets of the eccentric channels are arranged in a plane wherein the plane in which the inlets are arranged is parallel to the plane in which the outlets are arranged,
wherein the second cross sectional area of at least one eccentric channel is larger than the first cross sectional area of this eccentric channel, and
wherein the number of eccentric channels measures at least 50.

2. The device according to claim 1, wherein the cross sectional area of at least one eccentric channel enlarges continuously and/or monotonously in the direction of flow.

3. The device according to claim 1, wherein a quotient comprised of a sum of the first cross sectional areas for all eccentric channels and a sum of the second cross sectional areas for all eccentric channels ranges from 0.35 to 0.75.

4. The device according to claim 1, wherein a quotient comprised of the first cross sectional area and second cross sectional area for each eccentric channel ranges from 0.35 to 0.75.

5. The device according to claim 1, wherein the inlets and/or outlets of the eccentric channels are arranged in circular rings around the middle axis of the device.

6. The device according to claim 5, wherein the quotient comprised of the first cross sectional area and second cross sectional area is identical for each eccentric channel of the same ring.

7. The device according to claim 6, wherein the quotient comprised of the first cross sectional area and second cross sectional area for each eccentric channel drops as the distance between each ring and middle axis of the device rises.

8. The device according to claim 1, wherein the inlets and/or outlets of the eccentric channels are arranged in a point-symmetrical or axially symmetrical manner.

9. The device according to claim 1, wherein the eccentric channels are separated from each other in the area of the outlets of the eccentric channels by webs with a thickness of 0.3 mm or less.

10. The device according to claim 1, wherein a middle axis of each eccentric channel is inclined by an angle of inclination relative to the middle axis of the device.

11. The device according to claim 10, wherein the angle of inclination ranges between 1° and 6°.

12. A method for filling foodstuffs comprising the steps of
directing foodstuffs to an inflow area of a device for changing a jet shape of the foodstuffs,
passing the foodstuffs through several channels defined by the device, the several channels comprising at least a plurality of eccentric channels spaced apart from a middle axis of the device, and
directing the foodstuffs to an outflow area of the device,
wherein each eccentric channel comprises an inlet allocated to the inflow area and an outlet allocated to the outflow area,
wherein each inlet of the eccentric channels has a first cross sectional area,
wherein each outlet of the eccentric channels has a second cross sectional area,
wherein a quotient comprised of the first cross sectional area and the second cross sectional area drops as a distance between the eccentric channels and the middle axis of the device rises,
wherein the inlets and outlets of the eccentric channel are arranged in a plane wherein the plane in which the inlets are arranged is parallel to the plane in which the outlets are arranged,
wherein the second cross sectional area of at least one eccentric channel is larger than the first cross sectional area of this eccentric channel, and
wherein the number of eccentric channels measures at least 50.

13. The method according to claim 12, further comprising the step of aseptically filling the foodstuffs.

14. The device according to claim 1, wherein the free-flowing products are foodstuffs.

* * * * *